US011379453B2

(12) United States Patent
McRaven et al.

(10) Patent No.: US 11,379,453 B2
(45) Date of Patent: Jul. 5, 2022

(54) SYSTEMS AND METHODS FOR RETRIEVING AND PROCESSING DATA

(71) Applicant: Palantir Technologies Inc., Palo Alto, CA (US)

(72) Inventors: John McRaven, New York, NY (US); Andrei Alexandrescu, London (GB); Arjun Mathur, Stanwood, WA (US)

(73) Assignee: Palantir Technologies Inc., Denver, CO (US)

(*) Notice: Subject to any disclaimer, the term of this patent is extended or adjusted under 35 U.S.C. 154(b) by 143 days.

(21) Appl. No.: 15/995,814

(22) Filed: Jun. 1, 2018

(65) Prior Publication Data
US 2018/0349365 A1 Dec. 6, 2018

(30) Foreign Application Priority Data

Jun. 2, 2017 (GB) .................................. 1708818.8

(51) Int. Cl.
*G06F 16/23* (2019.01)
*G06F 16/907* (2019.01)
(Continued)

(52) U.S. Cl.
CPC .............. *G06F 16/23* (2019.01); *G06F 9/448* (2018.02); *G06F 16/2428* (2019.01);
(Continued)

(58) Field of Classification Search
CPC ...... G06F 9/448; G06F 16/26; G06F 16/2428; G06F 16/907; G06F 16/23
(Continued)

(56) References Cited

U.S. PATENT DOCUMENTS 5,532,717 A  7/1996 Jones et al.
5,724,575 A  3/1998 Hoover et al.
(Continued)

FOREIGN PATENT DOCUMENTS

AU   2014206155   12/2015
EP      0652513    5/1995
(Continued)

OTHER PUBLICATIONS

Official Communication from European Patent Application No. 18175647.9 dated Aug. 24, 2018.
(Continued)

*Primary Examiner* — Robert W Beausoliel, Jr.
*Assistant Examiner* — Arthur Ganger
(74) *Attorney, Agent, or Firm* — Knobbe, Martens, Olson & Bear LLP

(57) ABSTRACT

A system and method for processing data by accessing data sets for a plurality of variables in at least one data store; associating a plurality of the data sets as at least one variable type; storing in a data store a plurality of operation definitions defining a plurality of operations on at least one of said at least one variable type; receiving from a user interface a selection of at least one operation definition and at least one data set of said at least one variable type operated on by the selected at least one operation definition; and processing the at least one data set in response to the selection according to the at least one operation definition to generate a derived data set.

22 Claims, 9 Drawing Sheets

(51) Int. Cl.
*G06F 16/903* (2019.01)
*G06F 16/26* (2019.01)
*G06F 16/242* (2019.01)
*G06F 9/448* (2018.01)

(52) U.S. Cl.
CPC ............ *G06F 16/26* (2019.01); *G06F 16/907* (2019.01); *G06F 16/90335* (2019.01)

(58) Field of Classification Search
USPC ....................................................... 707/736
See application file for complete search history.

(56) References Cited

U.S. PATENT DOCUMENTS

| | | | |
|---|---|---|---|
| 5,872,973 | A | 2/1999 | Mitchell et al. |
| 5,897,636 | A | 4/1999 | Kaeser |
| 6,073,129 | A | 6/2000 | Levine et al. |
| 6,094,653 | A | 7/2000 | Li et al. |
| 6,161,098 | A | 12/2000 | Wallman |
| 6,243,717 | B1 | 6/2001 | Gordon et al. |
| 6,304,873 | B1 | 10/2001 | Klein et al. |
| 6,366,933 | B1 | 4/2002 | Ball et al. |
| 6,418,438 | B1 | 7/2002 | Campbell |
| 6,510,504 | B2 | 1/2003 | Satyanarayana |
| 6,549,752 | B2 | 4/2003 | Tsukamoto |
| 6,560,620 | B1 | 5/2003 | Ching |
| 6,574,635 | B2 | 6/2003 | Stauber et al. |
| 6,609,085 | B1 | 8/2003 | Uemura et al. |
| 6,745,382 | B1 | 6/2004 | Zothner |
| 6,976,210 | B1 | 12/2005 | Silva et al. |
| 6,980,984 | B1 | 12/2005 | Huffman et al. |
| 7,058,648 | B1 | 6/2006 | Lightfoot et al. |
| 7,111,231 | B1 | 9/2006 | Huck et al. |
| 7,194,680 | B1 | 3/2007 | Roy et al. |
| 7,233,843 | B2 | 6/2007 | Budhraja et al. |
| 7,461,158 | B2 | 12/2008 | Rider et al. |
| 7,667,582 | B1 | 2/2010 | Waldorf |
| 7,725,530 | B2 | 5/2010 | Sah et al. |
| 7,725,728 | B2 | 5/2010 | Ama et al. |
| 7,730,082 | B2 | 6/2010 | Sah et al. |
| 7,730,109 | B2 | 6/2010 | Rohrs et al. |
| 7,761,407 | B1 | 7/2010 | Stern |
| 7,814,084 | B2 | 10/2010 | Hallett et al. |
| 7,844,892 | B2 | 11/2010 | Shewchenko et al. |
| 7,962,495 | B2 | 6/2011 | Jain et al. |
| 7,984,374 | B2 | 7/2011 | Caro et al. |
| 8,041,714 | B2 | 10/2011 | Aymeloglu et al. |
| 8,060,259 | B2 | 11/2011 | Budhraja et al. |
| 8,112,425 | B2 | 2/2012 | Baum et al. |
| 8,126,848 | B2 | 2/2012 | Wagner |
| 8,185,819 | B2 | 5/2012 | Sah et al. |
| 8,401,710 | B2 | 3/2013 | Budhraja et al. |
| 8,504,542 | B2 | 8/2013 | Chang et al. |
| 8,676,857 | B1 | 3/2014 | Adams et al. |
| 8,930,331 | B2 | 1/2015 | McGrew et al. |
| 8,954,410 | B2 | 2/2015 | Chang et al. |
| 9,009,827 | B1 | 4/2015 | Albertson et al. |
| 9,043,696 | B1 | 5/2015 | Meiklejohn et al. |
| 9,092,482 | B2 | 7/2015 | Harris et al. |
| 9,116,975 | B2 | 8/2015 | Shankar et al. |
| 9,195,700 | B1 | 11/2015 | Becker |
| 9,208,159 | B2 | 12/2015 | Stowe et al. |
| 9,230,280 | B1 | 1/2016 | Maag et al. |
| 9,256,846 | B2 | 2/2016 | Stluka et al. |
| 9,280,532 | B2 | 3/2016 | Cicerone |
| 9,672,257 | B2 | 6/2017 | Tobin et al. |
| 9,753,935 | B1 | 9/2017 | Tobin et al. |
| 10,467,200 | B1* | 11/2019 | Trefler .............. G06F 16/24552 |
| 10,552,436 | B2* | 2/2020 | Stowe ...................... G06F 16/26 |
| 2001/0051949 | A1 | 12/2001 | Carey et al. |
| 2001/0056522 | A1 | 12/2001 | Satyanarayana |
| 2002/0091694 | A1 | 7/2002 | Hrle et al. |
| 2003/0105759 | A1 | 6/2003 | Bess et al. |
| 2003/0115481 | A1 | 6/2003 | Baird et al. |
| 2003/0120675 | A1 | 6/2003 | Stauber et al. |
| 2003/0126144 | A1* | 7/2003 | O'Halloran ........... G06F 16/245 |
| 2003/0130993 | A1 | 7/2003 | Mendelevitch et al. |
| 2003/0212718 | A1 | 11/2003 | Tester |
| 2004/0111410 | A1 | 6/2004 | Burgoon et al. |
| 2004/0117345 | A1 | 6/2004 | Bamford et al. |
| 2004/0117387 | A1 | 6/2004 | Civetta et al. |
| 2004/0148301 | A1 | 7/2004 | McKay et al. |
| 2005/0097441 | A1 | 5/2005 | Herbach et al. |
| 2005/0108231 | A1 | 5/2005 | Findleton et al. |
| 2005/0114763 | A1 | 5/2005 | Nonomura et al. |
| 2005/0131990 | A1 | 6/2005 | Jewell |
| 2005/0289524 | A1 | 12/2005 | McGinnes |
| 2006/0074881 | A1 | 4/2006 | Vembu et al. |
| 2006/0080316 | A1 | 4/2006 | Gilmore et al. |
| 2006/0095521 | A1 | 5/2006 | Patinkin |
| 2006/0106847 | A1 | 5/2006 | Eckardt et al. |
| 2006/0116991 | A1 | 6/2006 | Calderwood |
| 2006/0161558 | A1 | 7/2006 | Tamma et al. |
| 2006/0218206 | A1 | 9/2006 | Bourbonnais et al. |
| 2006/0218405 | A1 | 9/2006 | Ama et al. |
| 2006/0218491 | A1 | 9/2006 | Grossman et al. |
| 2006/0242630 | A1 | 10/2006 | Koike et al. |
| 2006/0253502 | A1 | 11/2006 | Raman et al. |
| 2006/0265397 | A1 | 11/2006 | Bryan et al. |
| 2006/0288035 | A1 | 12/2006 | Viavant |
| 2007/0050429 | A1 | 3/2007 | Goldring et al. |
| 2007/0061487 | A1 | 3/2007 | Moore et al. |
| 2007/0143253 | A1 | 6/2007 | Kostamaa et al. |
| 2007/0185850 | A1 | 8/2007 | Walters et al. |
| 2007/0233756 | A1 | 10/2007 | D'Souza et al. |
| 2007/0271317 | A1 | 11/2007 | Carmel |
| 2008/0015970 | A1 | 1/2008 | Brookfield et al. |
| 2008/0104060 | A1 | 5/2008 | Abhyankar et al. |
| 2008/0104149 | A1 | 5/2008 | Vishniac et al. |
| 2008/0195672 | A1 | 8/2008 | Hamel et al. |
| 2008/0201339 | A1 | 8/2008 | McGrew |
| 2008/0215546 | A1 | 9/2008 | Baum et al. |
| 2008/0270316 | A1 | 10/2008 | Guidotti et al. |
| 2008/0301378 | A1 | 12/2008 | Carrie |
| 2009/0031247 | A1 | 1/2009 | Walter et al. |
| 2009/0106308 | A1 | 4/2009 | Killian et al. |
| 2009/0164387 | A1 | 6/2009 | Armstrong et al. |
| 2009/0177962 | A1 | 7/2009 | Gusmorino et al. |
| 2009/0254971 | A1 | 10/2009 | Herz |
| 2009/0271435 | A1 | 10/2009 | Yako et al. |
| 2009/0313223 | A1 | 12/2009 | Rantanen |
| 2009/0313311 | A1 | 12/2009 | Hoffmann et al. |
| 2010/0036831 | A1 | 2/2010 | Vemuri et al. |
| 2010/0063968 | A1* | 3/2010 | Sheu .................. G06F 16/24522 707/736 |
| 2010/0070489 | A1 | 3/2010 | Aymeloglu et al. |
| 2010/0076939 | A1 | 3/2010 | Iwaki et al. |
| 2010/0082541 | A1 | 4/2010 | Kottomtharayil |
| 2010/0114817 | A1 | 5/2010 | Breeder et al. |
| 2010/0114831 | A1 | 5/2010 | Gilbert et al. |
| 2010/0114887 | A1 | 5/2010 | Conway et al. |
| 2010/0138842 | A1 | 6/2010 | Balko et al. |
| 2010/0145909 | A1 | 6/2010 | Ngo |
| 2010/0161565 | A1 | 6/2010 | Lee et al. |
| 2010/0161688 | A1 | 6/2010 | Kesselman et al. |
| 2010/0191884 | A1 | 7/2010 | Holenstein et al. |
| 2010/0211550 | A1 | 8/2010 | Daniello et al. |
| 2010/0211618 | A1 | 8/2010 | Anderson et al. |
| 2010/0235606 | A1 | 9/2010 | Oreland et al. |
| 2010/0283787 | A1 | 11/2010 | Hamedi et al. |
| 2010/0325581 | A1 | 12/2010 | Finkelstein et al. |
| 2011/0029498 | A1 | 2/2011 | Ferguson et al. |
| 2011/0047540 | A1 | 2/2011 | Williams et al. |
| 2011/0153592 | A1 | 6/2011 | DeMarcken |
| 2011/0173619 | A1 | 7/2011 | Fish |
| 2011/0184813 | A1 | 7/2011 | Barne et al. |
| 2011/0218978 | A1 | 9/2011 | Hong et al. |
| 2011/0258158 | A1 | 10/2011 | Resende et al. |
| 2011/0258242 | A1 | 10/2011 | Eidson et al. |
| 2011/0270812 | A1 | 11/2011 | Ruby |
| 2012/0072825 | A1 | 3/2012 | Sherkin et al. |
| 2012/0123989 | A1 | 5/2012 | Yu et al. |
| 2012/0124179 | A1 | 5/2012 | Cappio et al. |

(56) References Cited

U.S. PATENT DOCUMENTS

| | | |
|---|---|---|
| 2012/0150791 A1 | 6/2012 | Willson |
| 2012/0150925 A1 | 6/2012 | Gupta et al. |
| 2012/0159307 A1 | 6/2012 | Chung et al. |
| 2012/0221589 A1 | 8/2012 | Shahar et al. |
| 2012/0330908 A1 | 12/2012 | Stowe et al. |
| 2012/0330931 A1 | 12/2012 | Nakano et al. |
| 2013/0036346 A1 | 2/2013 | Cicerone |
| 2013/0060742 A1 | 3/2013 | Chang et al. |
| 2013/0066882 A1 | 3/2013 | Westbrooke |
| 2013/0097130 A1 | 4/2013 | Bingol et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0040276 A1 | 2/2014 | Chen et al. |
| 2014/0095543 A1 | 4/2014 | Hsiao et al. |
| 2014/0101139 A1 | 4/2014 | Gemert et al. |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0032609 A1* | 1/2015 | Abuelsaad ............ G06F 16/215 705/40 |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0186338 A1 | 7/2015 | Mirra et al. |
| 2015/0186434 A1 | 7/2015 | Eichinger et al. |
| 2015/0186483 A1 | 7/2015 | Tappan et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0278325 A1 | 10/2015 | Masuda et al. |
| 2015/0341467 A1 | 11/2015 | Lim et al. |
| 2015/0379065 A1 | 12/2015 | Yoshizawa et al. |
| 2016/0034545 A1 | 2/2016 | Shankar et al. |
| 2016/0062555 A1 | 3/2016 | Ward et al. |
| 2016/0088013 A1 | 3/2016 | Watson et al. |
| 2016/0164912 A1 | 6/2016 | Del Fante |
| 2016/0259626 A1* | 9/2016 | Thattai ................. G06F 16/212 |
| 2016/0274781 A1 | 9/2016 | Wilson et al. |
| 2016/0275432 A1 | 9/2016 | Guinness et al. |
| 2016/0328432 A1 | 11/2016 | Raghunathan |
| 2017/0212731 A1* | 7/2017 | Beck ..................... G06F 3/0482 |
| 2017/0270172 A1 | 9/2017 | Tobin et al. |
| 2017/0355036 A1 | 12/2017 | Rozmarynowski et al. |
| 2018/0039651 A1 | 2/2018 | Tobin et al. |
| 2018/0181629 A1 | 6/2018 | Stowe et al. |
| 2018/0357255 A1* | 12/2018 | Arasan ................. G06F 16/254 |
| 2019/0197147 A1* | 6/2019 | He ............................ G06F 8/70 |

FOREIGN PATENT DOCUMENTS

| | | |
|---|---|---|
| EP | 1126384 | 8/2001 |
| EP | 2555126 | 2/2013 |
| EP | 2863326 | 4/2015 |
| EP | 2891992 | 7/2015 |
| EP | 2993595 | 3/2016 |
| EP | 3101560 | 12/2016 |
| EP | 3279813 | 2/2018 |
| EP | 3343403 | 7/2018 |
| EP | 3410319 | 12/2018 |
| WO | WO 2008/043082 | 4/2008 |
| WO | WO 2012/025915 | 3/2012 |
| WO | WO 2014/019349 | 2/2014 |

OTHER PUBLICATIONS

Anonymous, "Welcome to Sensor Cloud!" Apr. 9, 2017, retrieved from the Internet: URL: https://web.archive.org/web/20170409125040/https://sensorcloud.com/welcome, 8 pages.

Kumar et al., "Mobile Sensor Cloud Computing: Controlling and Securing Data Processing over Smart Environment through Mobile Sensor Cloud Computing (MSCC)," 2013 International Conference on Computer Sciences and Applications, IEEE, Dec. 14, 2013, pp. 687-697.

Anonymous, "BackTult—JD Edwards One World Version Control System", in 1 page, Jul. 23, 2007.

Antoshenkov, Gennady, "Dictionary-Based Order-Preserving String Compression", The VLDB Journal, pp. 26-39, 1997.

"The Apache Cassandra Project," http://cassandra.apache.org/ Printed Sep. 14, 2011 in 3 pages.

"Apache HBase," http://hbase.apache.org/ printed Sep. 14, 2011 in 1 page.

Baker et al., "Megastore: Providing Scalable, Highly Available Storage for Interactive Services", 5th Biennial Conference on Innovative Data Systems Research (CIDR '11), Asilomar, California, Jan. 9-12, 2011.

Bernstein et al., "Hyder—A Transactional Record Manager for Shared Flash", 5th Biennial Conference on Innovative Data Systems Research (CIDR '11), vol. 12, Asilomar, California, Jan. 9-12, 2011.

Chang et al., "Bigtable: A Distributed Storage System for Structured Data", Google, Inc., OSDI'06: Seventh Symposium on Operating System Design and Implementation, Seattle, WA, Nov. 2006.

Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.

Devanbu et al., "Authentic Third-party Data Publication", http://www.cs.ucdavis.edu/~devanbu/authdbpub.pdf, p. 19, 2000.

Dreyer et al., "An Object-Oriented Data Model for a Time Series Management System", Proceedings of the 7th International Working Conference on Scientific and Statistical Database Management, p. 12, Charlottesville, Virginia, USA, Sept. 28-30, 1994.

Elmasri et al., "Fundamentals of Database Systems", Fourth Edition, pp. 455-491, 2004.

Hogue et al., "Thresher: Automating the Unwrapping of Semantic Content from the World Wide Web", 14th International Conference on World Wide Web, WWW 2005: Chiba, Japan, May 10-14, 2005.

Klemmer et al., "Where Do Web Sites Come From? Capturing and Interacting with Design History," Association for Computing Machinery, CHI 2002, Apr. 20-25, 2002, Minneapolis, MN, pp. 8.

Kokossi et al., "D7-Dynamic Ontology Management System (Design)", Information Societies Technology Programme, pp. 1-27.

Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.

Miklau et al., "Securing History: Privacy and Accountability in Database Systems", 3rd Biennial Conference on Innovative Data Systems Research (CIDR), pp. 387-396, Asilomar, California, Jan. 7-10, 2007.

Niepert et al., "A Dynamic Ontology for a Dynamic Reference Work", Joint Conference on Digital Libraries, pp. 1-10, Vancouver, British Columbia, Jun. 17-22, 2007.

Nierman, "Evaluating Structural Similarity in XML Documents", 6 pages, 2002.

Peng et al., "Large-scale Incremental Processing Using Distributed Transactions and Notifications", Proceedings of the 9th USENIX Symposium on Operating Systems Design and Implementation, USENIX, p. 14, 2010.

Quest, "Toad for ORACLE 11.6—Guide to Using Toad", pp. 1-162, Sep. 24, 2012.

Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.

Wikipedia, "Federated Database System," Sep. 7, 2013, retrieved from the internet on Jan. 27, 2015 http://en.wikipedia.org/w/index.php?title=Federated_database_system&oldid=571954221.

Wollrath et al., "A Distributed Object Model for the Java System", Conference on Object-Oriented Technologies and Systems, pp. 219-231, Jun. 17-21, 1996.

(56) References Cited

OTHER PUBLICATIONS

Yang et al., "HTML Page Analysis Based on Visual Cues", A129, pp. 859-864, 2001.
Zhao et al., "Exploratory Analysis of Time-Series with ChronoLenses," IEEE Transactions on Visualization and Computer Graphics, vol. 17, No. 12, Oct. 23, 2011, pp. 2422-2431.
Official Communication from European Patent Application No. 18175647.9 dated May 14, 2020.
Official Communication for European Patent Application No. 21216657.3 dated Mar. 17, 2022, 9 pages.

* cited by examiner

SYSTEMS AND METHODS FOR RETRIEVING AND PROCESSING DATA

TECHNICAL FIELD

The present disclosure relates to systems and methods for retrieving data from data sources and processing the data.

BACKGROUND

A database may store a large quantity of data gathered for a range of related data, which a user might want to analyze and compare to identify relationships and correlations between the data. For example, a system may comprise a large number of sensors that each collect measurements at regular intervals, and the measurements may be stored in the database and/or a system of databases. The measurement data can be supplemented with other data, such as information regarding events that occurred while the system was operational, and the supplemental data can also be stored in the database and/or the system of databases.

In some cases, a user may attempt to analyze a portion of the stored data. For example, the user may attempt to analyze a portion of the stored data that is associated with a specific time period. However, as the number of measurements increases over time, it can become very difficult for the user to identify the relevant data and perform the analysis. Also, the amount of raw data and analyzed data can become large requiring considerable data storage capabilities in the system.

Further, a user may wish to process data for variables that are related, such as variables originating from the same system or process, in a managed and simplified manner to reduce user input.

SUMMARY

The systems, and methods described herein each have several aspects, no single one of which is solely responsible for its desirable attributes. Without limiting the scope of this disclosure, several non-limiting features will now be discussed briefly.

Analysts and engineers often need to analyze and view large data sets for a range of data sources. There is a need to provide a system that allows analysts and engineers to easily retrieve, process, analyze and view these large data sets in a simple and repeatable manner for similar and related data sets.

One embodiment provides a method and system for processing data sets in which data sets for a plurality of variables in one or more data stores are accessed. Data sets are associated as one or more variable types and operation definitions defining operations on one or more of the variable types are stored. A user can select one or more operation definitions and one or more data sets of the variable types operated on by the one or more operation definitions and the selected one or more data sets are processed in accordance with the selected one or more operation definitions to generate a derived data set. In this way, the definitions of the operations at the level of the variable type rather than the data set allows a user to a select use the same operation definitions for different data sets of the same variable type.

In one embodiment, a plurality of data sets of a plurality of variable types is associated as related data sets having a related data sets designation. In this embodiment, a user can select one or more data sets by selecting a related data set designation. This allows a user to more simply define and select data processing operations on data sets.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

DETAILED DESCRIPTION OF IMPLEMENTATIONS

Figure 1:
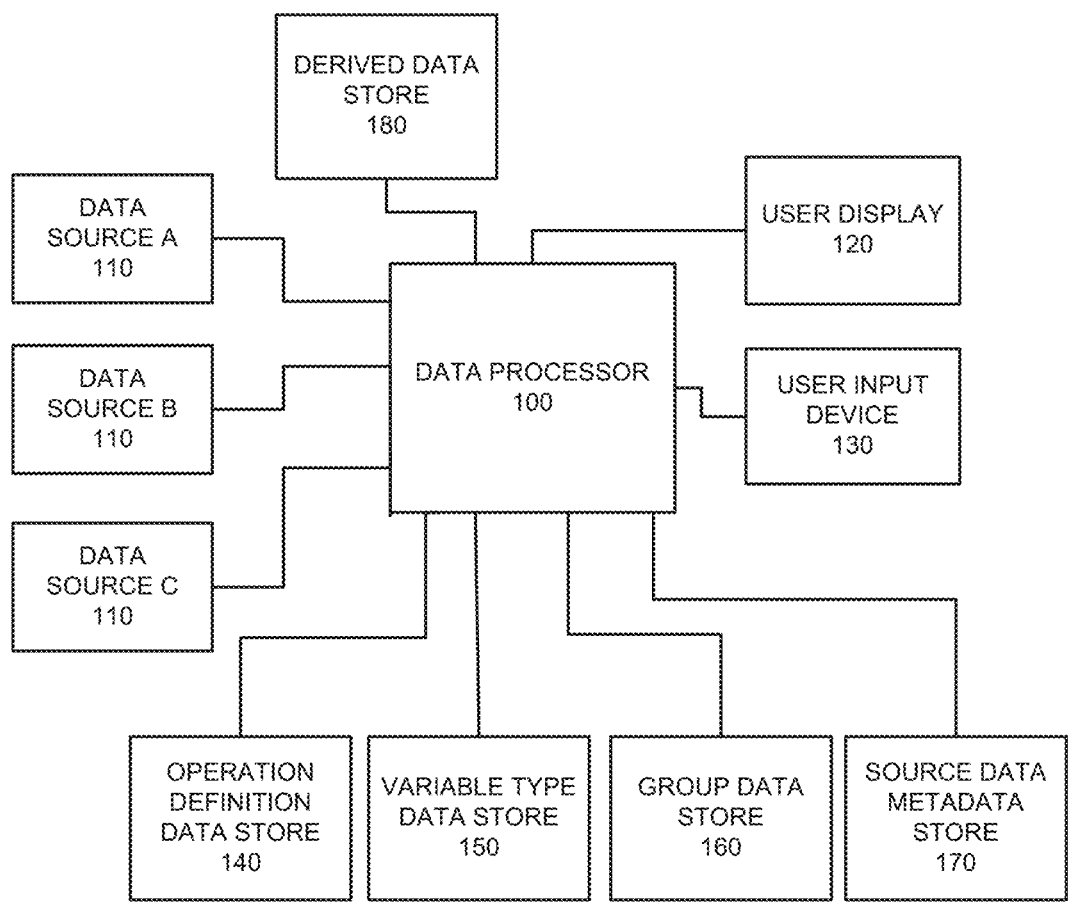
FIG. 1 is a schematic diagram of a system according to one embodiment.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store and Data Source: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, mySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. A "file system" may control how data is stored and/or retrieved (for example, a disk file system like FAT, NTFS, optical discs, etc., a flash file system, a tape file system, a database file system, a transactional file system, a network file system, etc.). For simplicity, the disclosure is described herein with respect to databases. However, the systems and techniques disclosed herein may be implemented with file systems or a combination of databases and file systems.

Referring now to FIG. 1, a system for processing data according to one embodiment comprises a data processor 100 for accessing data in one or more data sources 110. In FIG. 1 three data sources are shown as an example only. The data sources store source data sets to be accessed by a user for display and for processing to display processed data. The source data sets can comprise sets of sequential data. The data can be sequential in time, frequency or space or a combination thereof. The data can be physical data obtained from physical measurement from devices such as sensors related to physical parameters of components in a system or process, or data from a data processing system. The data can represent dynamic data that changes, such as over time or static in that it defines an invariant set of data related to a component e.g. physical component of a system or process.

A user input device 130 is provided to allow a user to make user selections of options and input parameters and information for use by the data processor 100 in the processing of the source data and the processed or derived data. A user display 120 is provided to enable a user to view displayed data in a chart generated by the data processor 100. The user display 120 and the user input device 130 comprise a user interface to the system.

In this embodiment, data stores 140, 150, 160, 170 and 180 are provided for the data processor 100 to store parameters and information used in the processing of the source data sets and processed or derived data sets. A source data metadata store 170 stores metadata for retrieved source data sets to be used in the processing of the source data sets and the determination of derived data sets for storage in a derived data store 180 either as derived data sets or as one or more operation definitions and source or derived data sets identifiers identifying the data sets operated on by the one or more operation definitions to generate the derived data. Hence, the derived data store 180 can store the actual derived data set or the definition and data to generate the derived data set.

The derived data store 180 can be used to store data defining a derived relationship between raw source data sets or derived data sets and the target derived data sets. The data stored comprises information identifying the source data sets required to be accessed and processed to determine the derived data set. The identification can comprise any form of logical identifier to identify the logical location of the data. The data can also include constraints on the source data sets to be retrieved such as sampling rate or range constraints. The data can also include information on the form of the query required to be sent to retrieve the source data sets. Different data sources (e.g. databases), may require different query formats to retrieve the source data sets. The data will also include information on the transformation(s) or operation(s) to be performed on the retrieved source data. This can be by reference to the operation stored in the operation definition data store 140. A derived data set may require multiple sequential (or possibly parallel) operations to be performed on retrieved source data sets. This can be arrived at by a user selecting to further process processed one or more derived data sets by selecting an operation to be performed on the derived data set(s). The derived data set(s) will also include metadata about the derived data set(s) which can at least in part be derived from the metadata for the source data sets. The metadata in the derived data sets can include any of the parameters of the metadata for the source data sets with additional information related to the operation result, which can include a data label, name or title, compound units, new scaling or sampling data, etc.

Metadata for the source data sets can be directly read from data such as context data associated with the source data sets or obtained from other data sources or input by the user. The metadata can comprise information on the source data sets, such as name of data, units for data, scaling parameters, sampling rate, information on the origin of the data (such as the identity of the physical apparatus from which the data originated, sensor type used, geographic or logical location, date and time the data was taken etc), owner of the data (company or business name), etc. The meta data for data sets can be used to identify related data sets for a related system or process, such as data sets from measurements from a physical system, entity or process or from a data processing system or process e.g. a factory, a vehicle, a plant, a building, machinery, an electrical system, a financial process or system, etc. The meta data identifies the origin or source of the data such as a component in a system of a part of a process. The data sets comprise data associated with the component.

In this embodiment, an operation definition data store 140 stores parameters defining user selected operations to be performed on user selected variable types in order to determine derived data sets or further derived data sets.

The operations which are part of the operation definitions for variable types can comprise any type of algorithmic, logical or mathematical operation, such as correlation, cross-correlation, mathematical operators, such as multiplication, division addition and subtraction, unit conversion (such as from Imperial to SI units), Fourier transform, wavelet transform, linear filters, non-linear filters, algebraic functions, thresholding, interpolation, extrapolation, derivatives, differentiation, integration, moving average, curve fitting etc. A predefined set of operations can be provided and a user can be allowed to input new operations for use in the generation and storage of the operation definitions. The range of operations available to a user can be limited to a subset of the total dependent upon factors such as their login details or the deployment or build of the software they are implementing.

In this embodiment, a variable type data store 150 stores data defining types of variables. The data defining types of variables can comprise a variable type identifier such as a name and parameters that define the variable type. The parameters can be obtained from metadata from data sets selected or assigned to a variable type or they can be manually input by a user using the user interface. The variable type data store 150 can also store identifiers identifying which data sets have been manually selected as or automatically assigned as a variable type. The identifiers will identify the data source 110 and the data set instance at the data source 110.

In this embodiment a group data store 160 stores data grouping related data sets for a related system or process, such as data sets from measurements from a physical system, entity or process or from a data processing system or process e.g. a factory, a vehicle, a plant, a building, machinery, an electrical system, a financial process or system, etc. The group data store 160 could form part of or be combined with the meta data store 170 since the meta data contains the information enabling the identification of a grouping or relationship between the data sets e.g. that they relate to the same entity or process.

Figure 9:
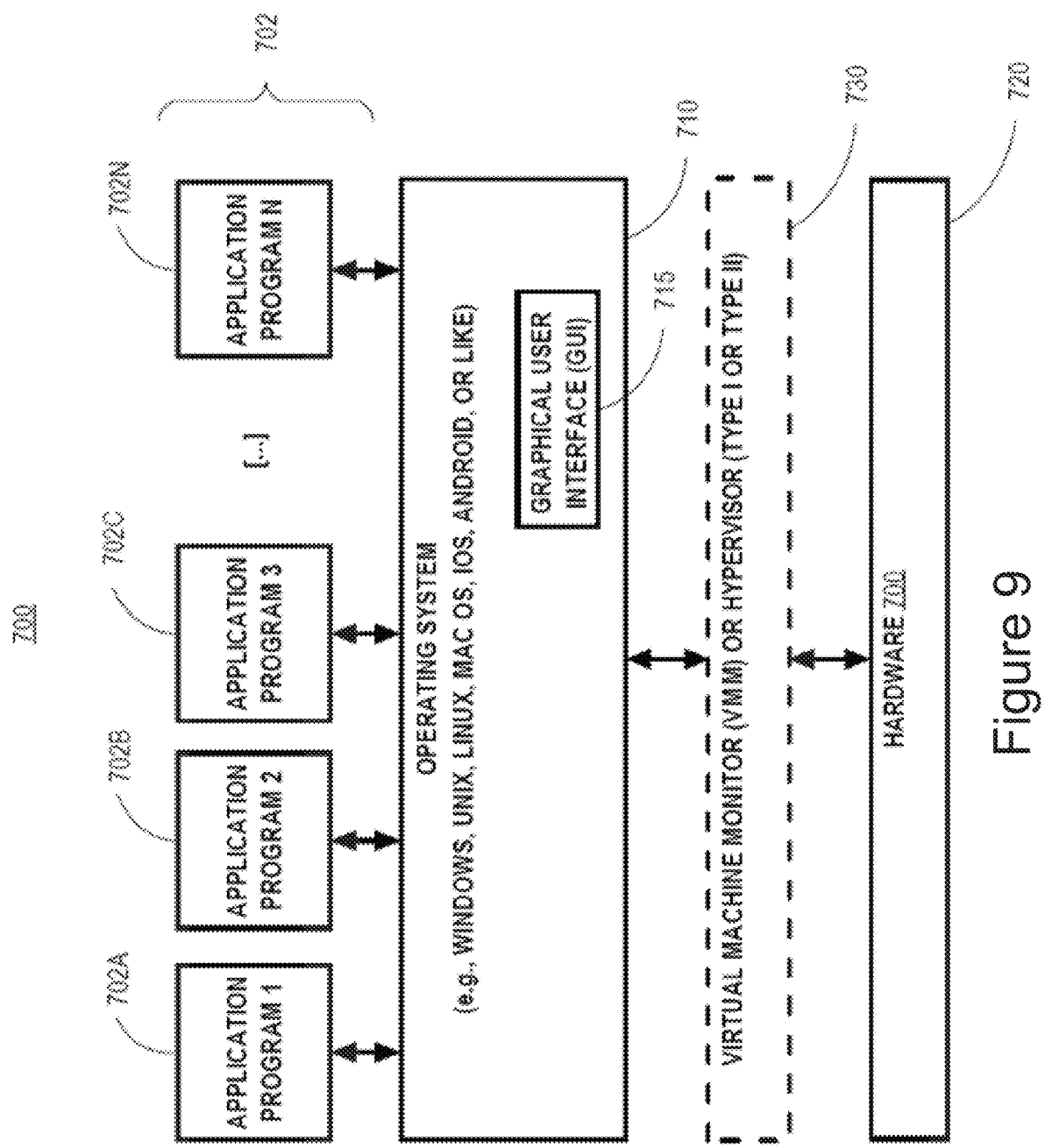
FIG. 9 is a block diagram of a basic software system for controlling the operation of the computing device according to one embodiment.

The data processor 100 may be implemented as a special-purpose computer system having logical elements, such as illustrated in FIG. 9. In an embodiment, the logical elements may comprise program instructions recorded on one or more machine-readable storage media. Alternatively, the logical elements may be implemented in hardware, firmware, or a combination thereof. In one embodiment, the data processor 100 may be implemented in a Java Virtual Machine (JVM) that is executing in a distributed or non-distributed computer system. In other embodiments, the data processor 100 may be implemented as a combination of programming instructions written in any programming language (e.g. C++, Visual Basic, Python, etc.) and hardware components (e.g., memory, CPU time) that have been allocated for executing the program instructions.

A user may use the user input device 130 and the user display 120 to view and interact with an interactive user interface generated by the data processor 100. For example, the user input device 130 and the user display 120 may be in a user device which may be in communication with the data processor 100 via a network. The user device can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

The data sources 110 can be provided locally with the data processor 100 or remotely connected over a network.

In an embodiment, the network can include any communications network, such as the Internet. The network may be a wired network, a wireless network, or a combination of the two. For example, network may be a local area network (LAN) and/or a wireless area network (WAN). For example, the network may include one or more firewalls and/or an endpoint server, such as a secure HTTP endpoint system.

Figure 2:
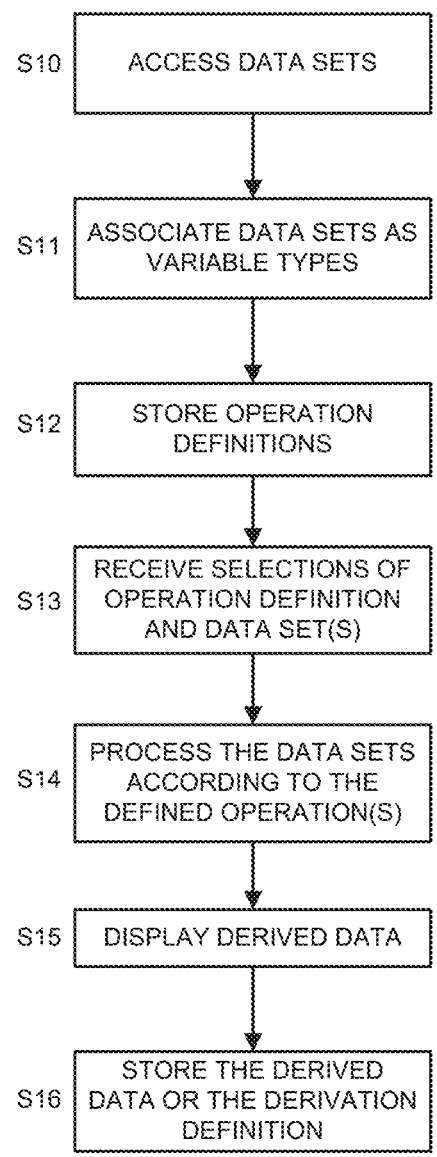
FIG. 2 is a flow diagram of a method according to one embodiment.

FIG. 2 is a flow diagram illustrating a process according to one embodiment.

In step S10 data sets are accessed from the data sources 110 and in step S11 data sets are associated with variable types using the processor 100. The association can be performed manually by a user using the user interface to select displayed identifiers for sets of data. Alternatively the association can be performed automatically. Context data associated with the data sets can be used to form meta data for the data sets and the meta data can be used for the association. The data can be displayed to assist with the manual selection of data sets for association with a variable type or the meta data can be processed to identify and associate data sets with appropriate variable types. The variable types can be names by the user and the input name is stored as part of the data for the variable type in the variable type data store 150.

In step S12 operation definitions are stored in the operation definition data store 140. The operation definitions define a plurality of operations that can be carried out on one or more variable types. The operation definitions can be prestored to be available for selection by a user or a user can enter data defining operation definitions so that the operation definitions are generated and then stored.

In step S13 a selection by a user is received of one or more operation definitions and one or more data sets of the one or more variable types operated on by the selected one or more operation definitions. In this way, the user selection instantiates the variable type with selected data sets to be operated on by the operation definition. In one embodiment, a plurality of the data sets of a plurality of variable types are associated as related data sets having a related data set designation (or grouping), and the receiving of the selection of one or more data sets comprises receiving a selection of a related data set designation. For example, instead of requiring a user to select a specific data set for each variable type, a user can select related data sets relating to a component, system or process, whereby the data sets of the appropriate variable type for the operation definitions are selected. To do this a user can simply select one or more operation definitions and a related set designation (or group name).

In step S14 the one or more data sets are processed in response to the selection according to the one or more operation definitions to generate a derived data set.

In step S15 the derived data set can be displayed to a user on the user display 120 and in step S16 the derived data set can be stored in the derived data store 180 as a data set or as a derivation definition comprising one or more identifiers for the operation definition and one or more data set identifiers.

In one embodiment, the process can be repeated and the derived data set generated by the first process iteration is treated as a data set to be accessed in step S10 in a second iteration of the process, whereby a further derived data set is generated. The process can be repeated a number of times when the derived data set is not stored, since each derived data set used in the derivation of a further derived data set must be generated before the further derived data set can be generated.

Figure 3:
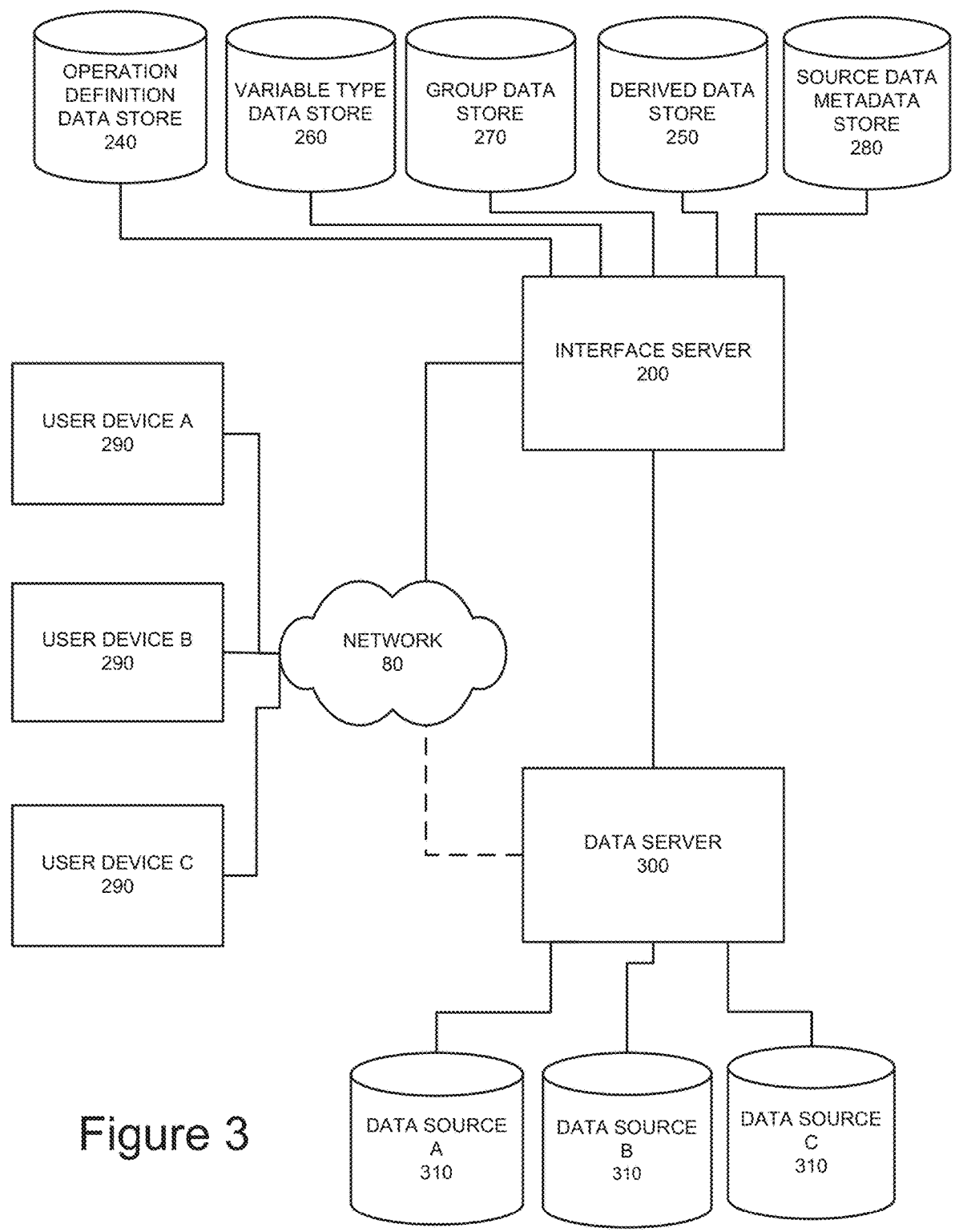
FIG. 3 is a schematic diagram of a system operating over a network according to one embodiment.

FIG. 3 illustrates an alternative embodiment implemented over a network 80. In an embodiment, the network 80 includes any communications network, such as the Internet. The network 80 may be a wired network, a wireless network, or a combination of the two. For example, network 80 may be a local area network (LAN) and/or a wireless area network (WAN). For example, the network 80 may include one or more firewalls and/or an endpoint server, such as a secure HTTP endpoint system.

Users can connect to the network to access the system using user devices 290, of which three are illustrates in FIG. 3 merely as one example. A user may use the user device 290 to view and interact with an interactive user interface generated by the interface server 200. The user device 290 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 290 may each execute a browser application to communicate with the interface server 200.

A data server 300 can be connected to the network 80 over which the user devices 290 are connected to the interface server 200, as indicated by the dotted line. In this embodiment, there is a more direct interface between the data server 300 and the interface server 200. This can be a direct connection or a connection of a separate local network.

The data server 300 is connected to one or more data sources 310 to provide access to the data sources 310. In this embodiment there are three data sources 310 illustrated, but any number may be used. Each data source 310 contains source data that a user of a user device 290 accessing the interface server 200 wants to view and analyze. The source data can comprise any type of data. In one embodiment, the data is sequential data for a plurality of associated sources. For example, the sequential data can be time sequential data, pattern sequential data, such as spatially sequential data or frequency sequential data. The source data can be obtained from many different data sources. For example, the data can be obtained from physical sensors detecting physical parameters. Alternatively the data could be determined from processed data, such as triggered financial parameters for example.

Figure 4:
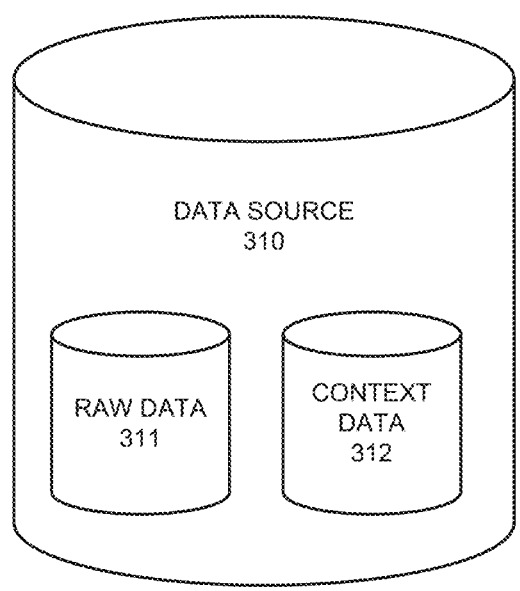
FIG. 4 is a schematic diagram of a data source according to one embodiment.

As illustrated in FIG. 4, each data source 310 can include raw data 311 and context data 312. The context data 312 comprises metadata for the raw data 311. This can include information on the raw data 311, such as name of data, units for data, scaling parameters, sampling rate, information on the origin of the data (such as the identity of the physical apparatus from which the data originated, sensor type used, geographic or logical location, date and time the data was taken etc), owner of the data (company or business name), etc.

Returning to FIG. 3, the interface server 200 is connected to data stores 240, 250, 260, 270, and 280 to store parameters and information used in the processing of the source data sets and derived data sets. A source data metadata store 280 stores metadata for retrieved source data sets to be used in the processing of the source data sets and the determination of derived data for storage in a derived data store 250. Metadata for the source data sets can be directly read from data such as the context data 312 associated with the source data sets or obtained from other data sources or input by the user. The metadata can comprise information on the source data, such as name of data, units for data, scaling parameters, sampling rate, information on the origin of the data (such as the identity of the physical apparatus from which the data originated, sensor type used, geographic or logical location, date and time the data was taken etc), owner of the data (company or business name), events related to the data, report data and data from related sources providing context information such as ambient temperature on the day sensor measurements were taken, etc.

In this embodiment, an operation definition data store 240 stores parameters defining operations to be performed on variable types. The operations defined can comprise any type of algorithmic or mathematical operation, such as correlation, cross-correlation, mathematical operators, such as multiplication, division addition and subtraction, unit conversion (such as from Imperial to SI units), Fourier transform, wavelet transform, linear filters, non-linear filters, algebraic functions, thresholding, interpolation, extrapolation, derivatives, differentiation, moving average, curve fitting etc. The range of operations available to a user can be limited to a subset of the total dependent upon factors such as their login details or the deployment or build of the software they are implementing.

In one embodiment, the derived data store 250 is used to store a derivation definition comprising data defining a derived relationship between raw source data and the target derived data. The derivation definition will store information identifying the source data set required to be accessed and processed to determine the derived data set. The identification can comprise any form of logical identifier to identify the logical location of the data set. The derivation definition can also include constraints on the source data set to be retrieved such as sampling rate or range constraints. The derivation definition can also include information on the form of the query required to be sent to retrieve the source data sets. Different data sources (e.g. databases), may require different query formats to retrieve the source data sets. The derivation definition will also include information on the transformation(s) or operation(s) to be performed on the retrieved source data. This can be by reference to the operation stored in the operation definition data store 240. A derived data set may require multiple sequential (or possibly parallel) operations to be performed on retrieved source data sets. This can be arrived at by a user selecting to further process derived data sets by selecting an operation to be performed on the derived data set. The derived data set will also include metadata about the derived data which can at least in part be derived from the metadata for the source data set. The metadata in the derived data set can include any of the parameters of the metadata for the source data sets with additional information related to the operation result, which can include a data label, name or title, compound units, new scaling or sampling data, etc.

In an alternative embodiment, the derived data set is stored as a data set in the derived data store 250.

The interface server 200 or the data server 300 may be implemented as a special-purpose computer system having logical elements, such as illustrated in FIG. 9. In an embodiment, the logical elements may comprise program instructions recorded on one or more machine-readable storage media. Alternatively, the logical elements may be implemented in hardware, firmware, or a combination thereof. In one embodiment, the data processor in the interface server 200 or the data server 300 may be implemented in a Java Virtual Machine (JVM) that is executing in a distributed or non-distributed computer system. In other embodiments, the data processor in the interface server 200 or the data server 300 may be implemented as a combination of programming instructions written in any programming language (e.g. C++, Visual Basic, Python, etc.) and hardware components (e.g., memory, CPU time) that have been allocated for executing the program instructions.

Figure 5:
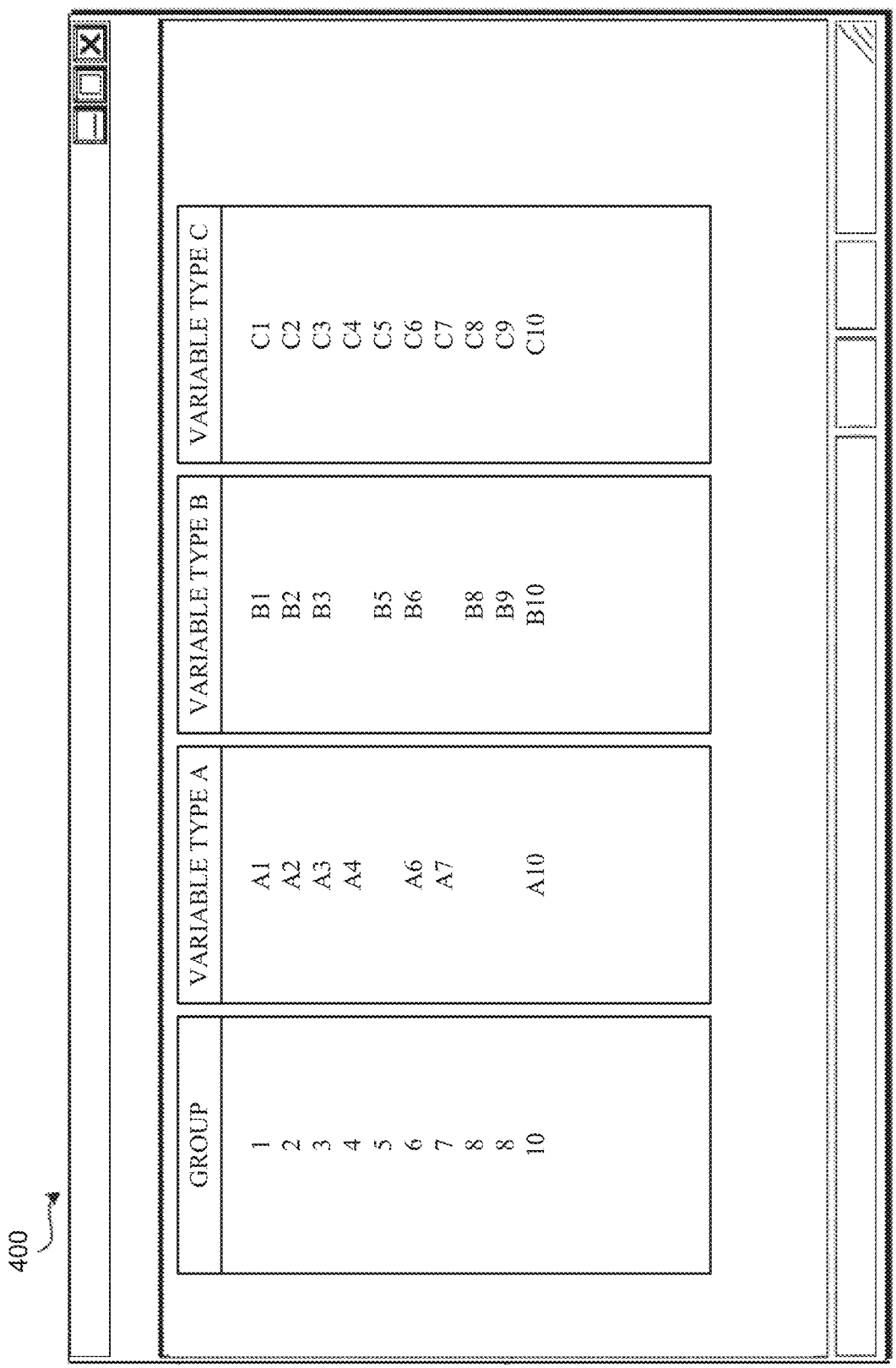
FIGS. 5-7 illustrate example user interfaces, according to various embodiments.

FIG. 5 is a diagram illustrating one embodiment of a user interface 400 served by the interface server 200 to the user devices 290 to display the organization of data sets as variable types in groups.

The user interface 400 displays a first column as a list of group identifiers (1, 2, 3, 4, 5, 6, 7, 8, 9, and 10). A group identifier identifies a set of related data sets. The identifier for the group can be descriptive to assist a user understand the related data. For example, the data sets could be data sets for automobile models, model 1, model 2 etc. The group identifier can be chosen and input by the user.

The other columns display data sets of various variable types. For example, in the automobile example, variable type A could comprise oil pressure, variable B could comprise engine speed, and variable C could comprise engine temperature. Each variable is time dependent and hence for each automobile model, there can be a set of data of each variable type. Not all groups of related data need have the same variables populated. For example, some automobile models may not have sensors to provide certain variable types. In the example shown in FIG. 5, for example model 4 does not have data for variable B, model 5 does not have data for variable type A, model 7 does not have data for variable type B etc. The missing variable type data may in some instances not be appropriate for certain models.

In order to create the data structure illustrated in FIG. 5, a user can select data sets by their identifiers and assign them to variable types manually. To do this a user can first create a variable type by manually defining certain meta data defining the variable type or by selecting a data set as the initial data set to define the variable type using the meta data associated with the data set. The data set can be similarly manually assigned to a group by either manually entering a group name or selecting a data set for the automatic determination of a group name from the meta data associated with the data set.

It can thus be seen in FIG. 5 that the data sets from the data sources are organized into a matrix relating the data sets to a system, component, or process (a group) and a plurality of variable types.

Operations between variables (operation definitions) can be defined and stored as logical operations. In one example, the variable type could comprises variable types A, B, C, D, E, F, G and H, where there are source data sets of variable types A, B and C and derived data sets of variable types D, E, F, G and H. The stored operation definitions defining operations on variable types could be for example, using simple operations:

$$D=A-B$$

$$E=dA/dt+C$$

$$F=D/E$$

$$G=F\times A$$

$$H=\mathrm{average}(D)$$

It can be seen from the above that an initial determination of the derived data set can form a data set of a different variable type to source data sets. Also, derived data sets can be derived by a number of iterations of the derivation process using different logical operations on variables. Each row above represents an operation definition and provides a definition that is at a variable type level and not specific to the data set or the group of data sets. Hence, the operation definitions are group independent.

Using the user interface, a user can search by variable name for a variable type to identify data sets that have metadata matching the meta data for the variable type. This allows for the bulk assignment of data sets to a variable type. A user can also search for data sets matching meta data for a group (or sets of related data sets). This allows for the bulk assignment of data sets to a group. The manual assignment of data sets to variable types and to groups allows for a user to check the data assignment and is necessary where the quality of the meta data for data sets is low.

Figure 6:
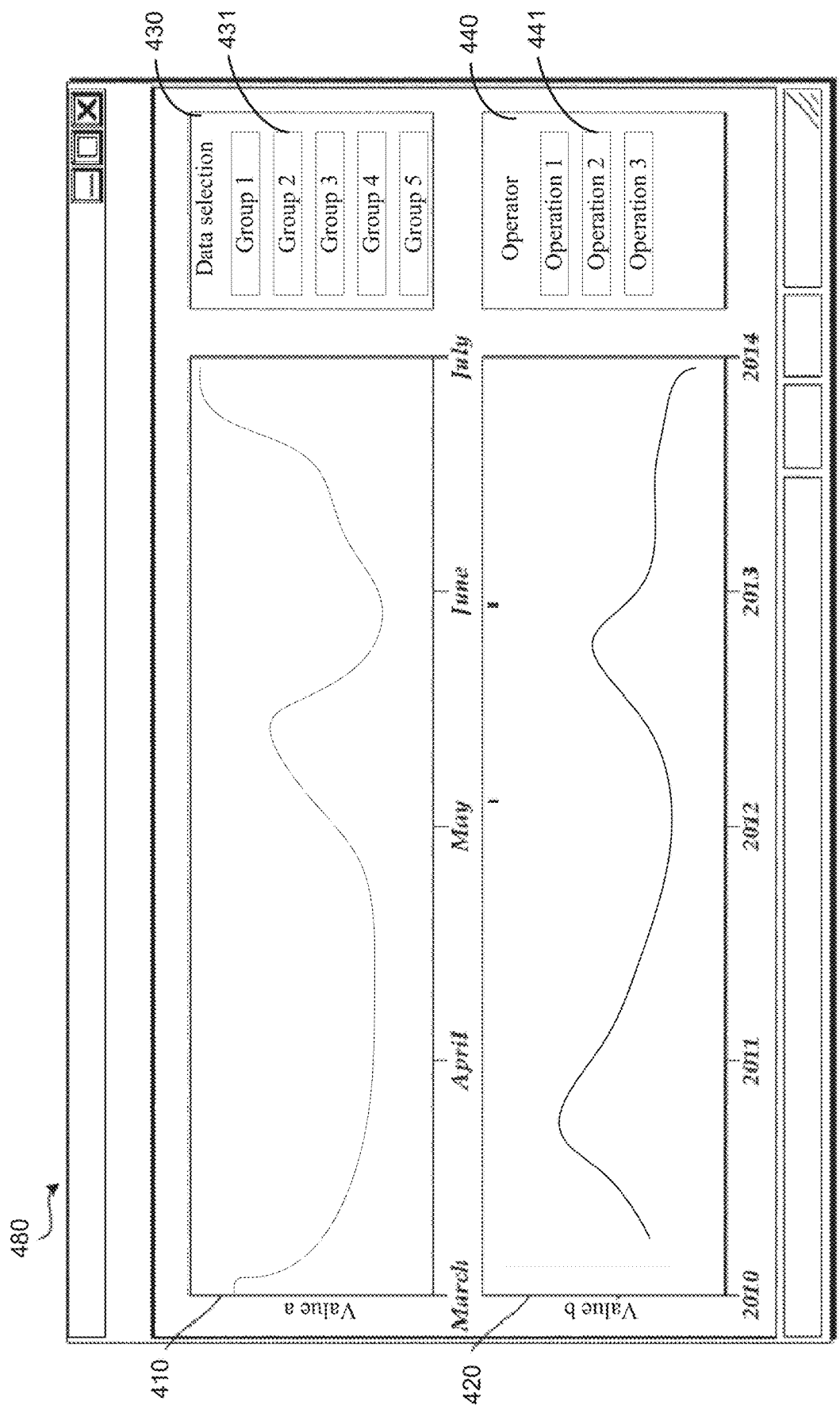

FIG. 6 is a diagram illustrating one embodiment of another user interface 480 served by the interface server 200 to the user devices 290.

In the user interface 480 one set of data is displayed as a chart 410 for "Value a" over a date range from March to July. This data will hence include one or more identifiers for the source or derived data plotted in the chart and metadata providing the information such as the chart axes units. Another set of data is displayed as a chart 420 for "Value b" over a date range from 2010 to 2014. This data will hence include one or more identifiers for the source or derived data plotted in the chart and metadata providing the information such as the chart axes units.

On the right hand side of the interface 480 is displayed two selectable regions 430 and 440. In one selectable region 430 data selection options 431 in the form of Group data selection options are displayed. The group data selection options 431 can comprise a selection of a set or related data sets (a group) for instantiating variable types in an operation definition. In the second selectable region 440 is displayed selectable operators 441 to be used to perform operations on selected group data by operation definitions defining the variable types operated on and the operations performed on instances of the variable types.

To generate derived data for display as a chart such as charts 410 or 420, a user can select a group and an operation. In order to easily and quickly view and compare similar data for similar systems or processes having data sets of similar variable types, a user can easily select a new group for the same operation. The charts 410 and 420 could for example be charts showing derived data for the same operation but different groups to allow side by side comparison of, for example, data for different automobile models.

The interface of FIG. 6 is an interactive user interface served by the interface server 200 to the user devices 290.

A user can use known selection mechanisms such as a touch screen or a pointer device to make selections from the selectable regions 430 and 440. Also, the user can make selections in the charts 410 and 420 to select regions in the charts 410 and 420 so as to select a subset of the data for use in the processing to generate a chart. For example, the user may select a reduced range such as in the time sequence e.g. the month of May in the chart 410 or the year 2013 in the chart 420. The limited range is then stored in the derived data for the new chart.

The interactive user interface 480 also allows a user to interact with the displayed charts 410 and 420 to perform display operations on the current charts that do not generate new charts, such as zoom, rotate, blur, stretch etc.

When a user selects to create a new chart, they can select a single chart to perform an operation on or they can select multiple charts to perform a combining operation or operations on.

Figure 7:
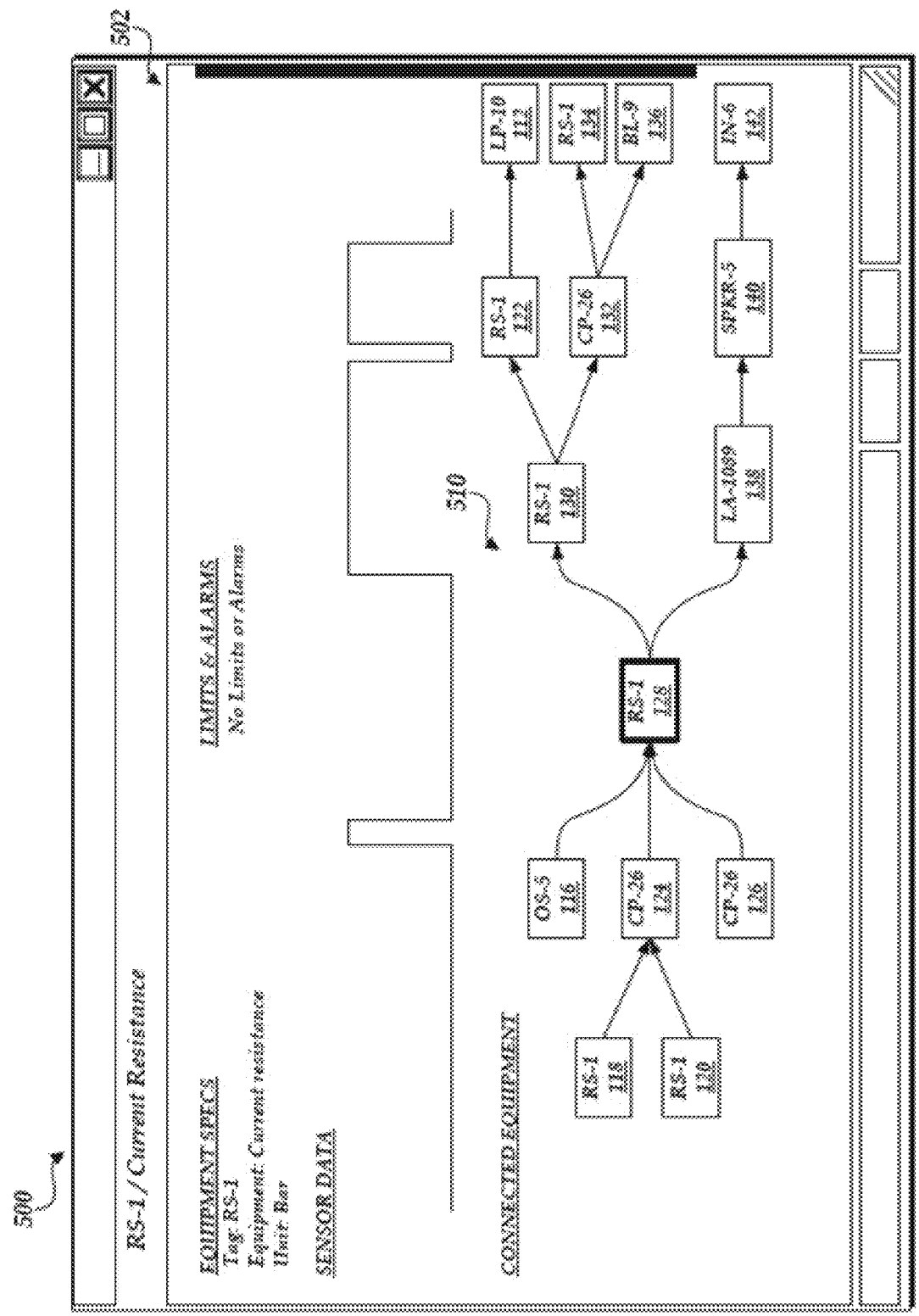

FIG. 7 is a diagram illustrating one embodiment of another user interface 500 served by the interface server 200 to the user devices 290.

In this embodiment the data sets are associated with physical components in a system, which in this embodiment comprises an electrical system. The user interface displays a schematic diagram 502 of interconnected components 510 of the system. In this embodiment, the interface allows a user to make a selection of at least one component and data sets associated with the selected components are accessed. The selection of the component in this embodiment can also provide a selection of at least one operation definition when operations are stored representing operations associated with the interconnected relationship of the components.

Basic Computing Device

Figure 8:
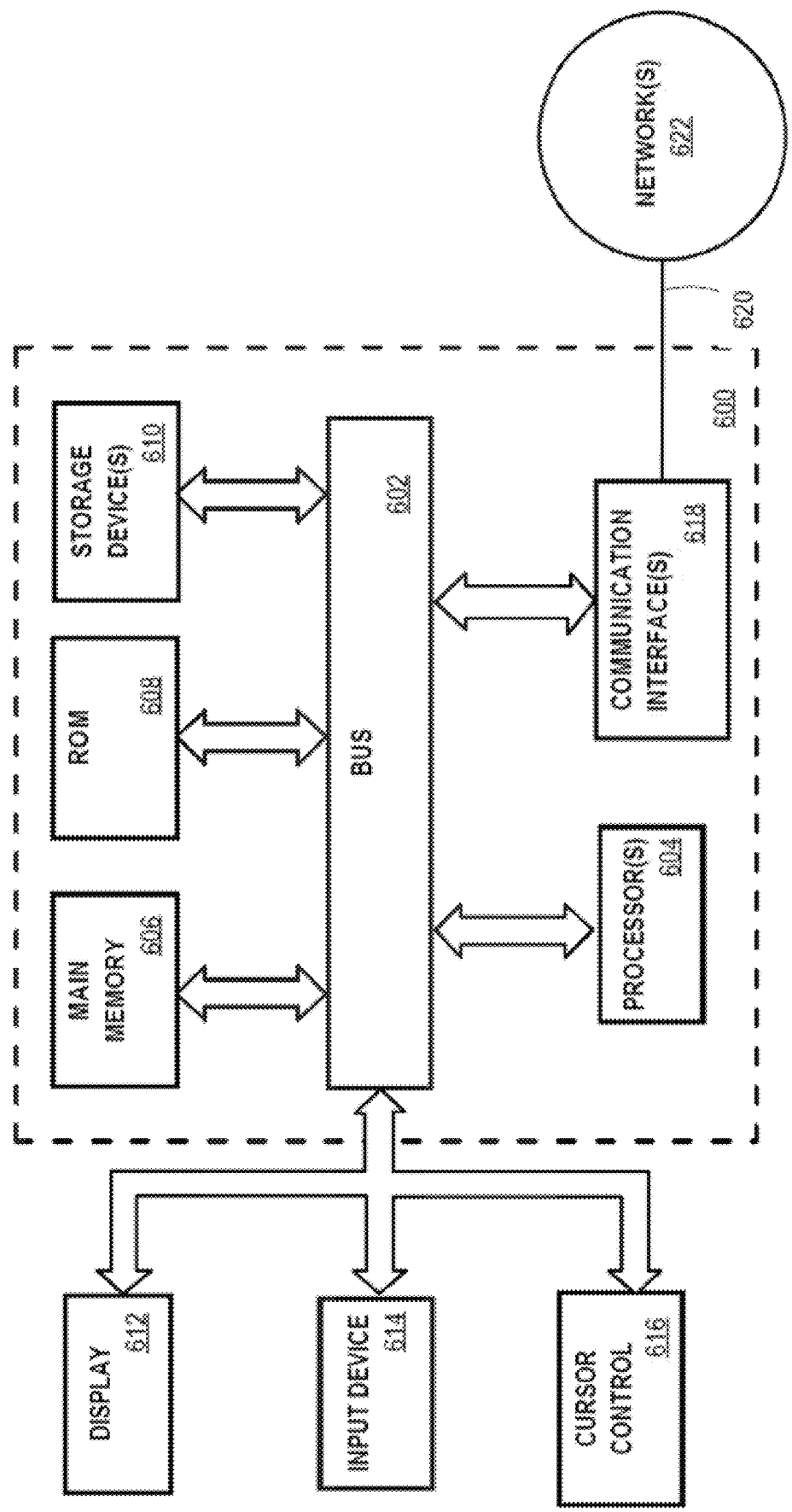
FIG. 8 is a general block diagram of a computing device according to one embodiment.

FIG. 8 is a block diagram that illustrates a basic computing device 600 in which the example embodiment(s) of the present invention may be embodied. Computing device 600 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 600 may include a bus 602 or other communication mechanism for addressing main memory 606 and for transferring data between and among the various components of device 600.

Computing device 600 may also include one or more hardware processors 604 coupled with bus 602 for processing information. A hardware processor 604 may be a general purpose microprocessor, a system on a chip (SoC), or other processor.

Main memory 606, such as a random access memory (RAM) or other dynamic storage device, also may be coupled to bus 602 for storing information and software instructions to be executed by processor(s) 604. Main memory 606 also may be used for storing temporary variables or other intermediate information during execution of software instructions to be executed by processor(s) 604.

Software instructions, when stored in storage media accessible to processor(s) 604, render computing device 600 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 600 also may include read only memory (ROM) 608 or other static storage device coupled to bus 602 for storing static information and software instructions for processor(s) 604.

One or more mass storage devices 610 may be coupled to bus 602 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 610 (e.g., the main hard disk for the device) stores a body of program and data for directing operation of the computing device, including an operating system, user application programs, driver and other support files, as well as other data files of all sorts.

Computing device 600 may be coupled via bus 602 to display 612, such as a liquid crystal display (LCD) or other electronic visual display, for displaying information to a computer user. In some configurations, a touch sensitive surface incorporating touch detection technology (e.g., resistive, capacitive, etc.) may be overlaid on display 612 to form a touch sensitive display for communicating touch gesture (e.g., finger or stylus) input to processor(s) 604.

An input device 614, including alphanumeric and other keys, may be coupled to bus 602 for communicating information and command selections to processor 604. In addition to or instead of alphanumeric and other keys, input device 614 may include one or more physical buttons or switches such as, for example, a power (on/off) button, a "home" button, volume control buttons, or the like.

Another type of user input device may be a cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

While in some configurations, such as the configuration depicted in FIG. 7, one or more of display 612, input device 614, and cursor control 616 are external components (i.e., peripheral devices) of computing device 600, some or all of display 612, input device 614, and cursor control 616 are integrated as part of the form factor of computing device 600 in other configurations.

Functions of the disclosed systems, methods, and modules may be performed by computing device 600 in response to processor(s) 604 executing one or more programs of software instructions contained in main memory 606. Such software instructions may be read into main memory 606 from another storage medium, such as storage device(s) 610. Execution of the software instructions contained in main memory 606 cause processor(s) 604 to perform the functions of the example embodiment(s).

While functions and operations of the example embodiment(s) may be implemented entirely with software instructions, hard-wired or programmable circuitry of computing device 600 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications. A machine readable medium carrying instructions in the form of code can comprise a non-transient machine-readable storage medium and a transmission medium, such as a signal carrying the instructions.

Various forms of media may be involved in carrying one or more sequences of one or more software instructions to processor(s) 604 for execution. For example, the software instructions may initially be carried on a magnetic disk or solid-state drive of a remote computer. The remote computer can load the software instructions into its dynamic memory and send the software instructions over a telephone line using a modem. A modem local to computing device 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor(s) 604 retrieves and executes the software instructions. The software instructions received by main memory 606 may optionally be stored on storage device(s) 610 either before or after execution by processor(s) 604.

Computing device 600 also may include one or more communication interface(s) 618 coupled to bus 602. A communication interface 618 provides a two-way data communication coupling to a wired or wireless network link 620 that is connected to a local network 622 (e.g., Ethernet network, Wireless Local Area Network, cellular phone network, Bluetooth wireless network, or the like). Communication interface 618 sends and receives electrical, electromagnetic, or optical signals that carry digital data streams representing various types of information. For example, communication interface 618 may be a wired network interface card, a wireless network interface card with an integrated radio antenna, or a modem (e.g., ISDN, DSL, or cable modem).

Network link(s) 620 typically provide data communication through one or more networks to other data devices. For example, a network link 620 may provide a connection through a local network 622 to a host computer 624 or to data equipment operated by an Internet Service Provider (ISP) 626. ISP 626 in turn provides data communication services through the world wide packet data communication network now commonly referred to as the "Internet" 628. Local network(s) 622 and Internet 628 use electrical, electromagnetic or optical signals that carry digital data streams. The signals through the various networks and the signals on network link(s) 620 and through communication interface(s) 618, which carry the digital data to and from computing device 600, are example forms of transmission media.

Computing device 600 can send messages and receive data, including program code, through the network(s), network link(s) 620 and communication interface(s) 618. In the Internet example, a server 630 might transmit a requested code for an application program through Internet 628, ISP 626, local network(s) 622 and communication interface(s) 618.

The received code may be executed by processor 604 as it is received, and/or stored in storage device 610, or other non-volatile storage for later execution.

Basic Software System

FIG. 9 is a block diagram of a basic software system 700 that may be employed for controlling the operation of computing device 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing device 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on device 700 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of device 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the device 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of device 600 directly. In these instances, the same Revision of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Generalized Embodiments

The following numbered examples are embodiments.

1. A method of processing data comprising:
at one or more machines comprising one or more processors and memory storing one or more programs executed by the one or more processors to perform the method, performing operations comprising:
accessing data sets for a plurality of variables in at least one data store;
associating a plurality of the data sets as at least one variable type;
storing in a data store a plurality of operation definitions defining a plurality of operations on at least one of said at least one variable type;
receiving from a user interface a selection of at least one operation definition and at least one data set of said at least one variable type operated on by the selected at least one operation definition; and
processing the at least one data set in response to the selection according to the at least one operation definition to generate a derived data set.

2. The method of example 1, including associating a plurality of the data sets of a plurality of variable types as related data sets having a related data set designation, wherein the receiving of the selection of at least one data set comprises receiving a selection of a related data set designation.

3. The method of example 1 or example 2, including associating the derived data set as one of the variable types.

4. The method of example 3, the method is repeated to generate a further derived data set by accessing the derived data set as one of the plurality of data sets, wherein the processing to generate the derived data set includes processing at least one data set including the derived data set in response to the selection according to the at least one operation definition to generate the further derived data set.

5. The method of example 4, including storing the derived data set to be available for the accessing.

6. The method of example 4, including storing the selected at least one operation definition and the selected at least one data set of said at least one variable type, and the accessing including processing the at least one data set in response to the selection according to the at least one operation definition to generate the derived data set to be available for accessing.

7. The method of any one of examples 1 to 6, wherein the associating the plurality of the data sets as at least one variable type comprises receiving at least one manual selection from a user interface.

8. The method of example 7, wherein the data sets have associated meta data, and at least parameters of the meta data are processed as meta data for the at least one variable type.

9. The method of example 7 or example 8, wherein the meta data for the at least one variable type is compared with the meta data for the data sets and a data set is associated with a variable type if at least one parameter of the meta data matches.

10. The method of any one of examples 1 to 6, wherein the associating the plurality of the data sets as at least one variable type comprises automatically identifying meta data associated with the data sets, and associating data sets to a variable type dependent upon a comparison of the metadata between the data sets.

11. The method as claimed in any one of examples 1 to 10, including generating a user interface displaying a schematic diagram of interconnected components of a system, wherein the data sets for the plurality of variables are associated with the components, the selection of the at least one operation definition and the at least one data set comprises receiving a selection of at least one component, and the accessing the data sets comprises accessing data sets for the at least one selected component.

12. A system for processing data comprising:
a data store;
memory storing program code; and
one or more processors for executing the program code to:
access data sets for a plurality of variables in at least one data store;
associate a plurality of the data sets as at least one variable type
storing in a data store a plurality of operation definitions defining a plurality of operations on at least one of said at least one variable type;
receive from a user interface a selection of at least one operation definition and at least one data set of said at least one variable type operated on by the selected at least one operation definition; and
process the at least one data set in response to the selection according to the at least one operation definition to generate a derived data set.

13. The system of example 12, wherein the program code includes program code for execution by the one or more processors to associate a plurality of the data sets of a plurality of variable types as related data sets having a related data set designation, wherein the receiving of the selection of at least one data set comprises receiving a selection of a related data set designation.

14. The system of example 12 or example 13, including associating the derived data set as one of the variable types.

15. The system of example 14, wherein the program code includes program code for execution by the one or more processors to repeat the steps to generate a further derived data set by accessing the derived data set as one of the plurality of data sets, wherein the processing to generate the derived data set includes processing at least one data set including the derived data set in response to the selection according to the at least one operation definition to generate the further derived data set.

16. The system of example 15, wherein the program code includes program code for execution by the one or more processors to store the derived data set to be available for the accessing.

17. The system of example 15, wherein the program code includes program code for execution by the one or more processors to store the selected at least one operation definition and the selected at least one data set of said at least one variable type, and the accessing including processing the at least one data set in response to the selection according to the at least one operation definition to generate the derived data set to be available for accessing.

18. The system of any one of examples 12 to 17, wherein the associating the plurality of the data sets as at least one variable type comprises receiving at least one manual selection from a user interface.

19. The system of example 18, wherein the data sets have associated meta data, and at least parameters of the meta data are processed as meta data for the at least one variable type.

20. The system of example 18, wherein the meta data for the at least one variable type is compared with the meta data for the data sets and a data set is associated with a variable type if at least one parameter of the meta data matches.

21. The system of any one of examples 12 to 17, wherein the associating the plurality of the data sets as at least one variable type comprises automatically identifying meta data associated with the data sets, and associating data sets to a variable type dependent upon a comparison of the metadata between the data sets.

22. The system as claimed in any one of examples 12 to 21, wherein the program code includes program code for execution by the one or more processors to generate a user interface displaying a schematic diagram of interconnected components of a system, wherein the data sets for the plurality of variables are associated with the components, the selection of the at least one operation definition and the at least one data set comprises receiving a selection of at least one component, and the accessing the data sets comprises accessing data sets for the at least one selected component.

23. A non-transitory storage medium storing program code for execution by one or more processors to:
access data sets for a plurality of variables in at least one data store;
associate a plurality of the data sets as at least one variable type
storing in a data store a plurality of operation definitions defining a plurality of operations on at least one of said at least one variable type;
receive from a user interface a selection of at least one operation definition and at least one data set of said at least one variable type operated on by the selected at least one operation definition; and
process the at least one data set in response to the selection according to the at least one operation definition to generate a derived data set.

24. A machine readable medium carrying program code for execution by one or more processors to carry out the method of any one of examples 1 to 11.

EXTENSIONS AND ALTERNATIVES

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:
1. A method of processing data comprising:
at one or more machines comprising one or more processors and memory storing one or more programs executed by the one or more processors to perform the method, performing operations comprising:
accessing a data store storing:
a plurality of group identifiers;
a plurality of variable types;
for each of the group identifiers, a plurality of data sets, wherein each data set is associated with a different variable type of the plurality of variable types; and
at least a first operation definition defining one or more operations and one or more variable types of the plurality of variable types, the first operation definition configured to generate a derived data set of a derived variable type from the one or more operations and the one or more variable types;
receiving, via a user interface, selection of a first group identifier;
receiving, via the user interface, selection of the first operation definition;
automatically selecting one or more data sets associated with both the selected first group identifier and the selected first operation definition, wherein each data set of the one or more data sets is associated with a variable type of the one or more variable types of the first operation definition; and
processing the automatically selected one or more data sets according to the selected first operation definition to generate a first derived data set associated with the first group identifier.

2. The method of claim 1, further including:
associating a subset of the data sets of a plurality of variable types as related data sets having a related data set designation, wherein the receiving of the selection of the first group identifier comprises receiving a selection of a related data set designation.

3. The method of claim 1, further including associating the derived data set as one of the variable types.

4. The method of claim 3, wherein the method is repeated to generate a further derived data set by accessing the derived data set as one of the plurality of data sets, wherein the processing to generate the derived data set includes processing at least one data set including the derived data set in response to the selection according to the first operation definition to generate the further derived data set.

5. The method of claim 4, further including storing the derived data set to be available for the accessing.

6. The method of claim 1, wherein at least some of associations between variable types and data sets are based on user input.

7. The method of claim 6, wherein the data sets have associated metadata, and at least parameters of the metadata are processed as metadata for the at least one variable type.

8. The method of claim 7, wherein the metadata for the at least one variable type is compared with the metadata for the data sets and a data set is associated with a variable type if at least one parameter of the metadata matches.

9. The method of claim 1, wherein at least some of the associations between variable types and data sets are automatically identified based associating data sets to a variable type dependent upon a comparison of metadata between the data sets.

10. The method of claim 1, further including generating a user interface displaying a schematic diagram of interconnected components of a system, wherein the data sets for the plurality of variables are associated with the components, the selection of the at least one operation definition and the at least one data set comprises receiving a selection of at least one component, and the accessing the data sets comprises accessing data sets for the at least one selected component.

11. A system for processing data comprising:
a data store;
memory storing program code; and
one or more processors for executing the program code to:
access the data store storing a plurality of group identifiers, a plurality of variable types, and, for each of the group identifiers, a plurality of data sets, wherein each data set is associated with a different variable type of a plurality of variable types;
access a first operation definition defining one or more operations and one or more variable types of the plurality of variable types, wherein the first operation definition is configured to generate a derived data set of a derived variable type from the one or more operations and the one or more variable types;
receive, via a user interface, selection of a first group identifier of the plurality of group identifiers;
receive, via the user interface, selection of a first operation definition;
automatically select one or more data sets associated with both the selected first group identifier and the selected first operation definition, wherein each data set of the one or more data sets is associated with a variable type of the one or more variable types of the first operation definition; and
process the automatically selected one or more data sets according to the selected first operation definition to generate a first derived data set associated with the first group identifier.

12. The system of claim 11, wherein the program code includes program code for execution by the one or more processors to associate a subset of the data sets of a plurality of variable types as related data sets having a related data set designation, wherein the receiving of the selection of the first group identifier comprises receiving a selection of a related data set designation.

13. The system of claim 11, further including associating the derived data set as one of the variable types.

14. The system of claim 13, wherein the program code includes program code for execution by the one or more processors to repeat the steps to generate a further derived data set by accessing the derived data set as one of the plurality of data sets, wherein the processing to generate the derived data set includes processing at least one data set including the derived data set in response to the selection according to the at least one operation definition to generate the further derived data set.

15. The system of claim 14, wherein the program code includes program code for execution by the one or more processors to store the derived data set to be available for the accessing.

16. The system of claim 14, wherein the program code includes program code for execution by the one or more processors to store the selected at least one operation definition and the selected at least one data set of said at least one variable type, and the accessing including processing the at least one data set in response to the selection according to the at least one operation definition to generate the derived data set to be available for accessing.

17. The system of claim 11, wherein at least some of the associations between variable types and data sets are based on user input.

18. The system of claim 17, wherein the data sets have associated metadata, and at least parameters of the metadata are processed as metadata for the at least one variable type.

19. The system of claim 18, wherein the metadata for the at least one variable type is compared with the metadata for the data sets and a data set is associated with a variable type if at least one parameter of the metadata matches.

20. The system of claim 11, wherein at least some of the associations between variable types and data sets are automatically identified based on associating data sets to a variable type dependent upon a comparison of metadata between the data sets.

21. The system as claimed in claim 11, wherein the program code includes program code for execution by the one or more processors to generate a user interface displaying a schematic diagram of interconnected components, wherein the data sets for the plurality of variables are associated with the components, the selection of the at least one operation definition and the at least one data set comprises receiving a selection of at least one component, and the accessing the data sets comprises accessing data sets for the at least one selected component.

22. A non-transitory storage medium storing program code for execution by one or more processors to:
access the storage medium storing a plurality of group identifiers, a plurality of variable types, and, for each of the group identifiers, a plurality of data sets, wherein each data set is associated with a different variable type of the plurality of variable types;
access a first operation definition defining one or more operations and one or more variable types of the plurality of variable types, wherein the first operation definition is configured to generate a derived data set of a derived variable type from the one or more operations and the one or more variable types;
receive, via a user interface, selection of a first group identifier of the plurality of group identifiers;
receive, via the user interface, selection of a first operation;
automatically select one or more data sets associated with both the selected first group identifier and the selected first operation definition, wherein each data set of the one or more data sets is associated with a variable type of the one or more variable types of the first operation definition; and
process the automatically selected one or more data sets according to the selected first operation definition to generate a first derived data set associated with the first group identifier.

* * * * *